US012121031B2

(12) United States Patent
Wang et al.

(10) Patent No.: US 12,121,031 B2
(45) Date of Patent: Oct. 22, 2024

(54) MAGNETIC BIOMASS CARBON-QUATERNARY PHOSPHONIUM SALT STERILIZATION MATERIAL, PREPARATION METHOD THEREFOR AND USAGE THEREOF

(71) Applicant: INSTITUTE OF SOIL SCIENCE, CHINESE ACADEMY OF SCIENCES, Nanjing (CN)

(72) Inventors: Fang Wang, Nanjing (CN); Yuhao Fu, Nanjing (CN); Hongjie Sheng, Nanjing (CN); Yongrong Bian, Nanjing (CN); Xin Jiang, Nanjing (CN)

(73) Assignee: INSTITUTE OF SOIL SCIENCE, CHINESE ACADEMY OF SCIENCES, Nanjing (CN)

( * ) Notice: Subject to any disclaimer, the term of this patent is extended or adjusted under 35 U.S.C. 154(b) by 445 days.

(21) Appl. No.: 17/428,589

(22) PCT Filed: Apr. 21, 2020

(86) PCT No.: PCT/CN2020/085812
§ 371 (c)(1),
(2) Date: Aug. 4, 2021

(87) PCT Pub. No.: WO2021/004116
PCT Pub. Date: Jan. 14, 2021

(65) Prior Publication Data
US 2022/0117237 A1   Apr. 21, 2022

(30) Foreign Application Priority Data
Jul. 5, 2019   (CN) .......................... 201910601263.0

(51) Int. Cl.
*A01N 65/00*   (2009.01)
*A01N 57/34*   (2006.01)
(Continued)

(52) U.S. Cl.
CPC ............. *A01N 65/00* (2013.01); *A01N 57/34* (2013.01); *A01P 1/00* (2021.08); *C02F 1/283* (2013.01);
(Continued)

(58) Field of Classification Search
None
See application file for complete search history.

(56) References Cited

U.S. PATENT DOCUMENTS

2009/0191250 A1   7/2009   Gooch et al.

FOREIGN PATENT DOCUMENTS

| CN | 101642699 A | 2/2010 |
| CN | 102784623 A | 11/2012 |

(Continued)

OTHER PUBLICATIONS

English language translation of CN 103949212 A, Publ. Jul. 30, 2014. (Year: 2014).*

(Continued)

*Primary Examiner* — Dominic Lazaro

(57) ABSTRACT

The present invention provides a magnetic biochar-quaternary phosphonium salt bactericidal material, a preparation method therefor and usage thereof, and belongs to the field of water treatment. The preparation method comprises: 1) using corn straw biochar as a precursor to prepare magnetic biochar by a co-precipitation method; and 2) adding the magnetic biochar into deionized water, then adding a quaternary phosphonium salt, performing the magnetic stir at room temperature, raising the temperature after sufficient impregnation, carrying out a hydrothermal reaction, and then cooling to the room temperature to obtain the bactericidal material. The temperature is raised to 60° C.~70° C. The recycling of the biochar material is effectively realized, the long-acting sterilization of the quaternary phosphonium (Continued)

salt bactericide and the magnetic recovery and recycling of the materials are realized, the residue of the bactericide is reduced, and a foundation is laid for the effective removal of microorganisms in wastewater.

9 Claims, 4 Drawing Sheets

(51) Int. Cl.
    *A01P 1/00*         (2006.01)
    *C02F 1/28*         (2023.01)
    *C02F 1/50*         (2023.01)
    *C02F 103/02*       (2006.01)
    *C02F 103/36*       (2006.01)

(52) U.S. Cl.
    CPC ............... *C02F 1/288* (2013.01); *C02F 1/50* (2013.01); *C02F 2103/023* (2013.01); *C02F 2103/365* (2013.01); *C02F 2303/04* (2013.01)

(56) References Cited

FOREIGN PATENT DOCUMENTS

| CN | 103949212 A | * | 7/2014 |
| CN | 105536703 A | | 5/2016 |
| CN | 106362690 A | | 2/2017 |
| CN | 109603751 A | | 4/2019 |
| CN | 110226604 A | | 9/2019 |

OTHER PUBLICATIONS

Xiao et al., "Synthesis and Characterization of Porous Carbons Materials Containing Quaternary Phosphonium Salt Based on Activated Carbon," Chinese Journal of Inorganic Chemistry, Jun. 2012, pp. 1222-1228, vol. 28 No. 6.

* cited by examiner

MAGNETIC BIOMASS CARBON-QUATERNARY PHOSPHONIUM SALT STERILIZATION MATERIAL, PREPARATION METHOD THEREFOR AND USAGE THEREOF

TECHNICAL FIELD

The present invention belongs to the technical field of water treatment and environmental protection, relates to a magnetic biochar-quaternary phosphonium salt bactericidal material, preparation method therefor and usage thereof, and particularly to a magnetic biochar-quaternary phosphonium salt for the control of microbial contamination in water, including the industrial circulating water, domestic sewage and recycling oilfield water.

BACKGROUND

With the rapid development of urbanization, the urban population continues to grow and intensively concentrate, which inevitably results in a large scale of daily life. Correspondingly, the domestic garbage produced by urban residents, domestic sewage and the requirement of industrial water are increasing year by year. A large amount of pollutants would be directly discharged into the environments without adequate treatments, which will not only lead to the serious water pollution, but also aggravate the shortage of water resources in China.

Urban sewage reuse refers to the treated domestic and/or industrial wastewater to be the source of industrial, agricultural or municipal water. The amount of water containing pollutants in urban sewage only accounts for 0.1% of the total amount of sewage. Therefore, the discharge of treated urban sewage would not contaminate the water body, which is conducive to the sustainable utilization of water resources. Furthermore, urban sewage contains a large number of pathogenic bacteria, such as *Escherichia coli, Salmonella, Shigella Castellani*, etc., which can lead to the outbreak of typhoid fever, septicemia and acute gastroenteritis, and bring a serious threat to public health.

Industrial circulating water provides a good living condition for microbial growth, such as the suitable temperature (25~40° C.), moderate pH and saturated dissolved oxygen. However, the rapid growth of microorganisms will seriously destroy the cooling water system. For example, the generation of slime by heterotrophic bacteria, hydrogen sulfide by sulfate-reducing bacteria, and rust deposition by iron bacteria commonly occur to result in the clogging and corrosion of pipelines.

During the oilfield production, a large amount of sewage would be produced. Oilfield sewage should be purified before rejection, otherwise there would be some problems such as corrosion, scaling and bacterial breeding. There are many kinds of microorganisms in the oilfield sewage, including sulfate reducing bacteria (SRB), iron bacteria (IB), saprophytic bacteria (TGB), algae and protozoa. These bacteria have a strong vitality and an amazing reproduction speed, and their metabolites (biological sludge, ferrous sulfide, etc.) can cause equipment corrosion, bottom blockage and worsen the water quality. Therefore, it is necessary to conduct the effective disinfection on the sewage.

According to the related statistics, about 100,000 tons per day of chemical germicidal agents are consumed in the world, most of which are disposable and water-soluble. For example, quaternary phosphonium salt (organic cationic antibacterial agent), a kind of low-toxicity, high-efficiency and broad-spectrum bactericide, is widely used in the water treatment. As a water-soluble chemical bactericide, the addition of quaternary phosphonium salt in the disinfection would produce substantial residues, which is usually discharged into surface water without treatment, thus contaminating the rivers and lakes. Therefore, using chemical modification to graft water-soluble chemical bactericide onto porous inorganic carrier may effectively achieve the property of high efficiency, low toxicity and slow release of antibacterial agent.

Many studies have reported that existing inorganic carriers mainly include graphene oxide, clay minerals and diatomite. For example, inorganic $Ag-CoFe_2O_4$-GO and organic GO-1227, fabricated by the carrier of graphene oxide, show the high antibacterial capacities, which only need the dosage of 50 and 10 mg/L, respectively, to remove the bacteria (up to $10^6$ CFU/mL) in water. Although graphene oxide carrier has an excellent germicidal efficacy, it is difficult to be widely used in practical production due to its high cost. Therefore, many researches begin to focus on the low-cost, wide-source antibacterial materials, such as the simply synthesized polystyrene-silver nanoparticles (PS/Ag), abundantly sourced chlorinated natural rubber quaternary ammonium salt (PTQ), and low-cost fabricated chitosan silver nanocomposites (HNTs-CS@Ag). However, the actual dosages of these antibacterial materials in disinfection are relatively high, up to 500, 1000 and 180 mg/L, respectively. Additionally, the use of clay minerals and diatomite as carriers could reduce the preparation cost to a certain extent. However, the synthesized complex materials with a high density will increase the possibility of silting and plugging when used, which is not conducive to the recovery and reuse.

In view of the forgoing, it is urgent to invent a new organic-inorganic complex material with a good bactericidal effect, a long-term bactericidal performance, and low-cost and recyclable properties.

SUMMARY OF THE INVENTION

To overcome the defects that the water-soluble bactericide quaternary phosphonium salt in the prior art cannot be effectively recycled after being used in water, which will result in a large amount of drug residues and is unable to carry out a long-term sterilization, the present invention provides an effective, recyclable, long-acting and low-cost antibacterial agent for microbial decontamination in water.

The magnetic biochar-quaternary phosphonium salt bactericidal material is prepared as follows:

1-1) using corn straw biochar as a precursor to prepare magnetic biochar by a co-precipitation method;

1-2) adding the magnetic biochar into deionized water, followed by an addition of quaternary phosphonium salt, magnetically stirring at room temperature, fully impregnating, then heating for a hydrothermal reaction, cooling to room temperature to obtain the bactericidal material.

As a further improvement of the present invention, in the step 1-2), the impregnation time is not less than 12 h, the heating temperature for a hydrothermal reaction is 60° C.~70° C. The purpose of impregnation for no less than 12 h is to give a saturated impregnation, making the quaternary phosphonium salt solution fully fill into the internal pores of biochar.

As a further improvement of the present invention, the quaternary phosphonium salt comprising dodecyl tributyl phosphonium bromide also can be other kinds of quaternary phosphonium salts.

As a further improvement of the present invention, the mass ratio of the magnetic biochar and the quaternary phosphonium salt is 1: (1~50). Within the range, the magnetic biochar-quaternary phosphonium salt bactericidal material can achieve a better bactericidal effect.

As a further improvement of the present invention, the mass ratio of the magnetic biochar and the quaternary phosphonium salt is 1: (1~30). Within the range, the magnetic biochar-quaternary phosphonium salt bactericidal material can achieve a superior bactericidal effect.

As a further improvement of the present invention, the step 1-1) particularly comprises the following steps:

1) under anoxic environment, adding $Fe^{3+}$ and $Fe^{2+}$ (or $FeCl_3.6H_2O$ and $FeSO_4.7H_2O$) sequentially into deionized water with vigorous stir, followed by an addition of ammonia, and adding a biochar suspension after the reaction is stable, magnetically stirring in a water bath and heating to obtain the product;

2) performing the solid-liquid separation of the product obtained in step 1), washing to remove impurities, and drying until the washing liquid is neutral to obtain magnetic biochar.

As a further improvement of the present invention, a method for regenerating the bactericidal material is provided, comprising the following steps:

a) washing and drying the recovered bactericidal materials, and then regenerating the product according to the operation method in step 1-2);

b) adding the product prepared in step a) into water containing microorganisms for sterilization;

c) repeating the steps a) and b).

As a further improvement of the present invention, the microorganisms include *Escherichia coli* and/or *Staphylococcus aureus*.

As a further improvement of the present invention, the bactericidal material of the present invention is particularly prepared as follows:

S1: using corn straw biomass at 500° C. as a precursor of magnetic biochar, placing it into deionized water and mixing by ultrasonic vibration to form a biochar suspension;

S2: under $N_2$ atmosphere, adding $Fe^{3+}$ and $Fe^{2+}$ (or $FeCl_3.6H_2O$ and $FeSO_4.7H_2O$) sequentially into deionized water with vigorous stir; and quickly adding ammonia into the above solution, and followed by an addition of the prepared biochar suspension while magnetically stirring in a water bath to obtain the black crystalline product;

S3: cooling to room temperature after the reaction is completed, separating the product by a permanent magnet, and sequentially washing with absolute ethanol and deionized water to remove impurities until the washing liquid is neutral, and drying to obtain the magnetic biochar;

S4: taking the magnetic biochar into deionized water, followed by an addition of dodecyl tributyl phosphonium bromide. The mass ratio of the magnetic biochar and dodecyl tributyl phosphonium bromide is 1:(1~50). Magnetic particles are stirred overnight at room temperature, fully impregnated, heated to 60° C.~70° C. for a hydrothermal reaction. After cooling to room temperature, the product is magnetically separated, and then washed several times until the pH of the washing liquid is neutral, drying and crushing to obtain the magnetic biochar-quaternary phosphonium salt bactericidal material.

The magnetic biochar-quaternary phosphonium salt bactericidal material of the present invention not only has an efficient bactericidal effect, but also the adsorption and purification functions, and is suitable for bactericidal treatment of microbial contamination in water, including the industrial circulating water, domestic sewage and recycling oilfield water.

The magnetic biochar-quaternary phosphonium salt firstly combines the biochar and magnetic particles to prepare the magnetic biochar, followed by the synthesis of magnetic biochar-quaternary phosphonium salt, which is an effective bactericide against microbes in water. Additionally, the slow-release effect of newly synthesized composite could effectively resolve the problems of drug residues and short-term duration of water-soluble bactericides.

The magnetic biochar-quaternary phosphonium salt strengthens the antibacterial effect. During the loading process of quaternary phosphonium salt, magnetic biochar is fully impregnated in the quaternary phosphonium salt solution so as to absorb quaternary phosphonium salt into the macro/micro pores. Then the hydrothermal reaction was carried out by heating, which can effectively activate the quaternary phosphonium salt, strengthen the covalent bond between functional groups and quaternary phosphonium salt, and finally enhance the loading amount of quaternary phosphonium salt on the magnetic biochar.

The magnetic biochar-quaternary phosphonium salt can not only powerfully kill pathogenic microorganisms in water environment, but also realize the solid-liquid separation via magnetic properties, leading to the reuse of composites. In addition to the outstanding advantages of environmental protection, saving and low cost, the selected carrier, biochar, can realize the resource utilization of biomass materials and is easy to be popularized.

The magnetic biochar-quaternary phosphonium salt could be regenerated after magnetic recovery, which showed higher bactericidal effect than that of the first prepared material. That might be due to the residual covalent bonding quaternary phosphonium salt attached into the recovered materials, and the regeneration process improves the loading amount of quaternary phosphonium salt on the magnetic biochar.

DETAILED DESCRIPTION OF THE INVENTION

Figure 1:
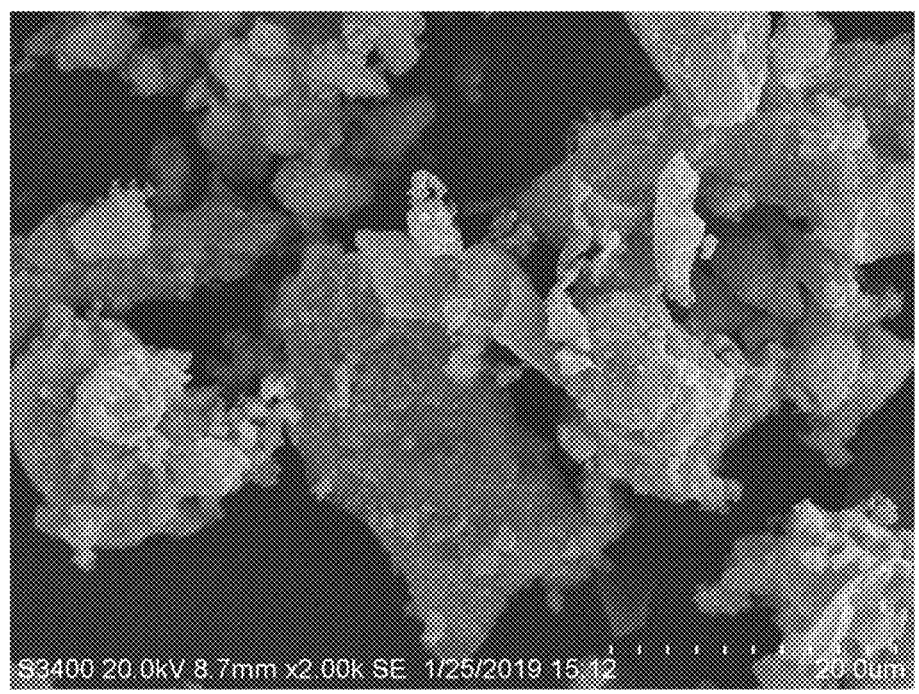
FIG. 1 is a scanning electron microscope (SEM) image of magnetic biochar prepared in Example 1.

The present invention provides the preparation of magnetic biochar-quaternary phosphonium salt, which is composed of biochar, magnetic irons and quaternary phosphonium salt. The method of preparing a magnetic biochar-quaternary phosphonium salt composite comprises the steps of: (a) biochar was produced at 500° C. under anoxic environments using corn straw as the feedstock due to its abundance in agricultural wastes; (b) biochar was dispersed in deionized water by sonication for 30 min to obtain a biochar suspension; (c) under $N_2$ atmosphere, $FeCl_3.6H_2O$ and $FeSO_4.7H_2O$ were added into three-neck flask filled with deionized water with vigorous magnetic stir; (d) 25% ammonia was quickly added into the produced solution and followed by an addition of the prepared biochar suspension while stirring in a water bath; (e) after cooling to the room temperature, the product, magnetic biochar, was magnetically separated, washed by absolute ethanol and deionized water to remove impurities, and dried in a vacuum oven; (f) dodecyl tributyl phosphonium bromide ($C_{24}H_{52}BrP$) was slowly dissolved in deionized water in amounts of 1.0~50.0 g, where magnetic biochar powder (1.0 g) was added into the above solutions under continuous stir overnight, then quaternary phosphonium salt was self-assembled with magnetic biochar after agitating at 60° C.~70° C. The resulting precipitate, magnetic biochar-quaternary phosphonium salt was washed several times to remove unassembled bromonium ions, and vacuum-dried in a vacuum oven.

The magnetic biochar-quaternary phosphonium salt not only has a high-efficiency bactericidal effect, but also adsorption and purification for waste water, and would be suitable for bactericidal disinfection in industrial circulating water, domestic sewage and recycling oilfield water.

The magnetic biochar-quaternary phosphonium salt for the control of microbial contamination in water will be better understood with reference to the following examples.

Example 1

Synthesis of Magnetic Biochar

According to the method mentioned in Chinese patent application No. CN200920232191.9, corn straw biochar (500° C.) was obtained: the corn straw was washed by tap water and deionized water successively, and oven-dried for 12 h at 80° C.

Then the dried straw was transferred into the biochar reactor under oxygen-limited conditions according to a stepwise heating program from 200° C. to 500° C. At each temperature node (such as 300° C., 400° C., 500° C.), the temperature was maintained for 1.5 h. When no further smoke was emitted from the gas exit pipe, the biochar reactor was closed. After cooling to room temperature, the prepared biochar was crushed and passed through a nylon sieve.

1.0 g of biochar was placed in a beaker containing 100 mL deionized water, and vibrated in an ultrasonic cleaner (100 W) to obtain a well-mixed biochar suspension.

Under $N_2$ atmosphere, 6.08 g $FeCl_3.6H_2O$ and 4.17 g $FeSO_4.7H_2O$ were added into three-neck flask filled with 100 mL deionized water with vigorous magnetic stir, followed by a quick addition of 10 mL 25% ammonia. After the reaction was stable, the biochar suspension was added, and the reaction was subject to the magnetic stir for 45 min at 85° C. in water bath. After cooling to room temperature, the magnetic biochar was obtained by magnetic separation.

Figure 2:
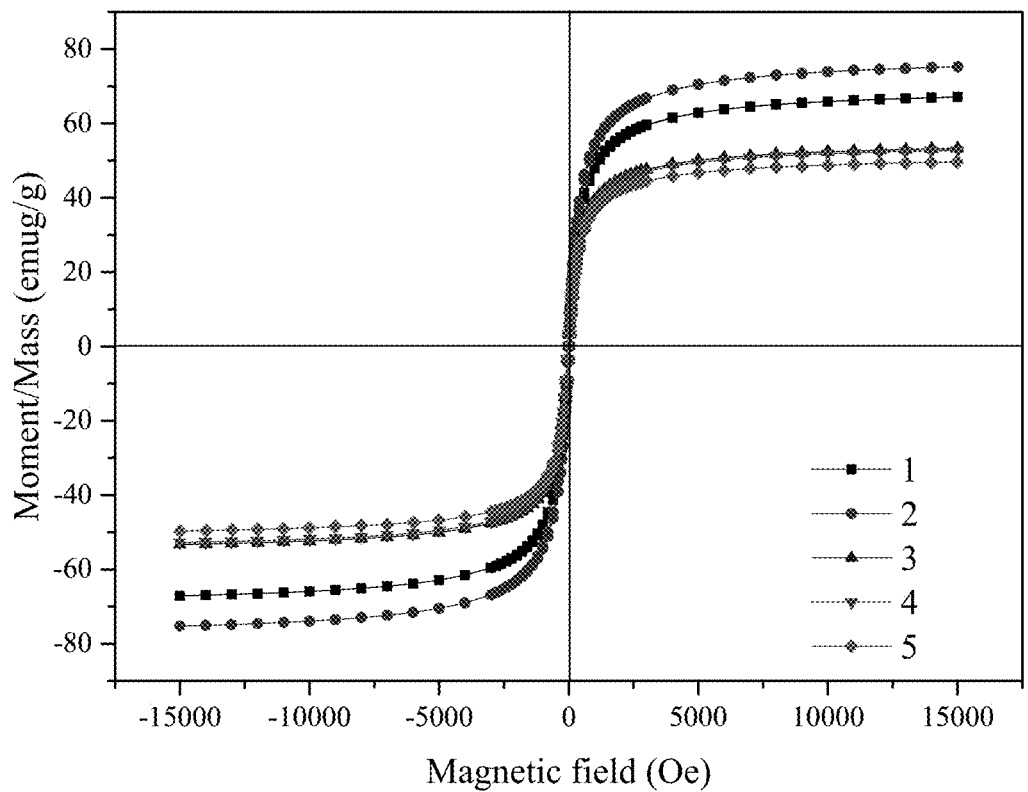
FIG. 2 is a magnetic hysteresis loop for magnetic bactericidal materials prepared in Example 1-5.

The results showed that magnetic iron ions were loaded in the surface pores of biochar by scanning electron microscope (SEM) as shown in FIG. 1. It can be seen from FIG. 2 that the saturation magnetization of magnetic biochar at room temperature is 67.13 emu/g (curve 1).

Figure 3:
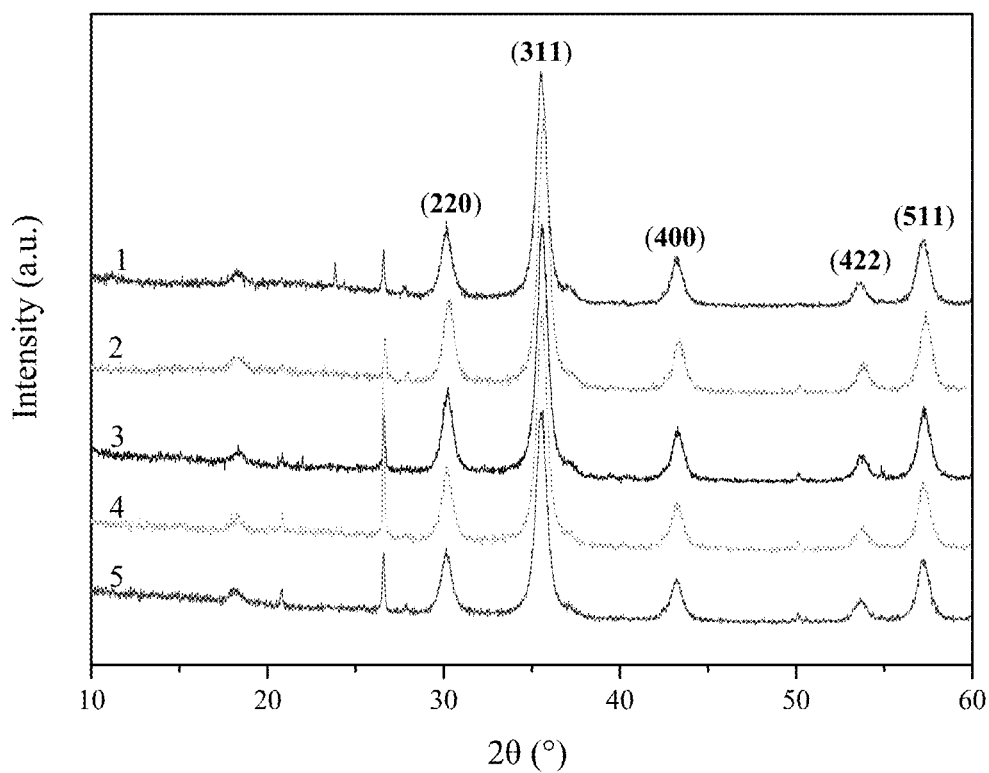
FIG. 3 is a X-ray diffraction (XRD) pattern of magnetic bactericidal materials prepared in Example 1-5.
Figure 4:
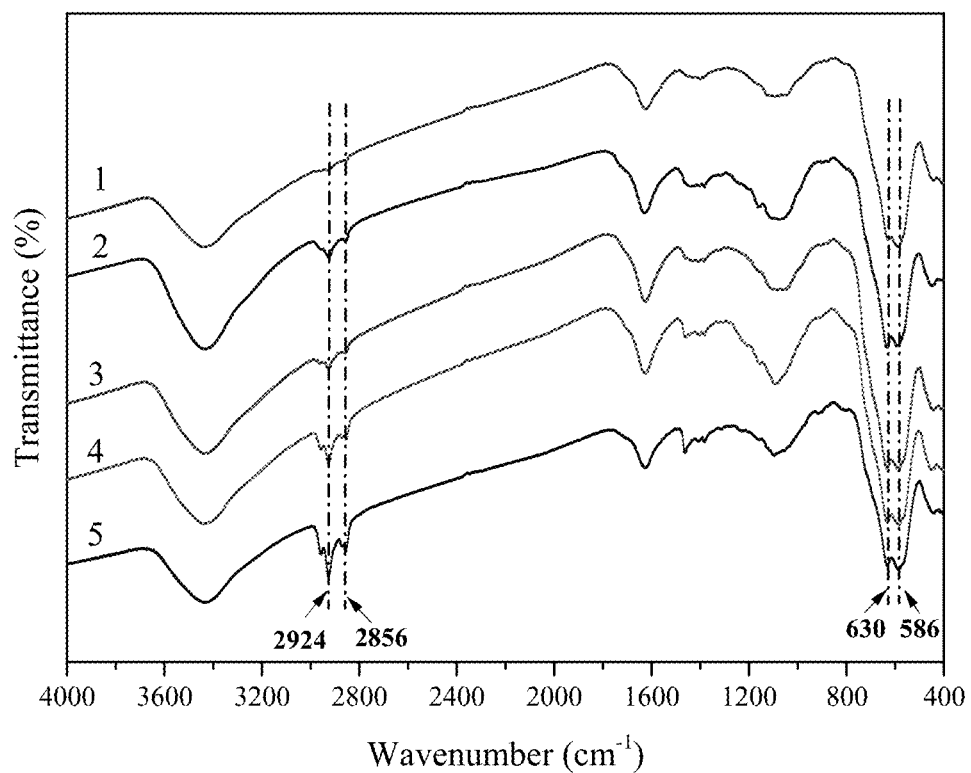
FIG. 4 is Fourier transform infrared spectrometer (FTIR) spectra of magnetic bactericidal materials prepared in Example 1-5.
Figure 5:
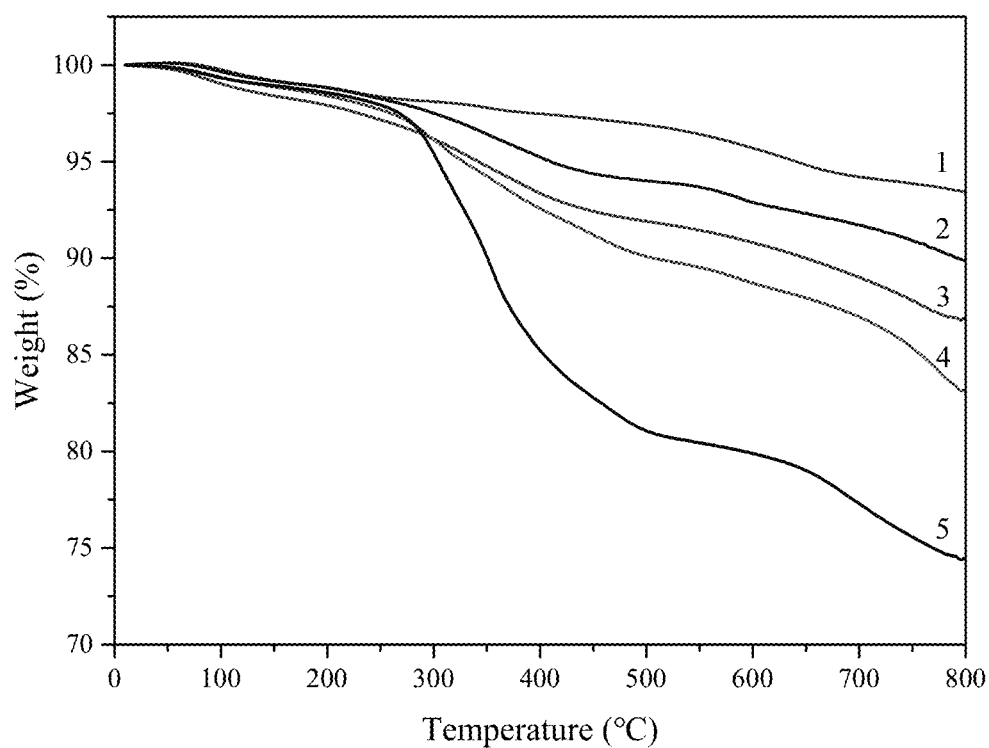
FIG. 5 is a thermo-gravimetric analysis (TGA) plot of magnetic bactericidal materials prepared in Example 1-5.

As shown in FIG. 3 (XRD spectrum), five new produced diffraction peaks of magnetite at 2θ=30.1°, 35.4°, 43.1°, 53.4° and 56.9° were obvious (curve 1); the Fourier transform infrared (FTIR) spectrum (curve 1) shown in FIG. 4 further confirmed the existence of Fe—O characteristic peaks (630 and 586 cm$^{-1}$); the thermogravimetric analysis test (curve 1) as shown in FIG. 5 showed that the magnetic biochar has good thermal stability, with only 6.64% material loss up to 800° C.

Example 2

Synthesis of Magnetic Biochar-Quaternary Phosphonium Salt with Mass Ratio of 1:1 (MBQ-1)

1.0 g of magnetic biochar prepared in example 1 was taken into a beaker containing 200 mL deionized water. In the meanwhile, 1.0 g of dodecyl tributyl phosphonium bromide ($C_{24}H_{52}BrP$) was added into the above solutions under continuous stir overnight (12 h) at room temperature. After the full impregnation, dodecyl tributyl phosphonium bromide was self-assembled with magnetic biochar after agitating for 4 h at 65° C. After cooling to room temperature, the product was magnetically separated, washed several times until the pH of the washing liquid was neutral, and then placed in a vacuum drying oven (70° C., -0.06 MPa). Finally, the magnetic biochar-quaternary phosphonium salt with the mass ratio of 1:1 (MBQ-1) was obtained.

The saturation magnetization of MBQ-1 at room temperature was 75.27 emu/g (curve 2 in FIG. 2); as shown in FIG. 3 (XRD spectrum), the diffraction peaks of magnetite at 2θ=30.1°, 35.4°, 43.1°, 53.4° and 56.9° were also obtained (curve 2); in addition to the corresponding Fe—O characteristic peaks at 630 and 586 cm$^{-1}$, new —$CH_2$ stretching vibration peaks were generated at 2924 and 2856 cm$^{-1}$ in FTIR spectrum (curve 2 in FIG. 4), which proved the successful loading of quaternary phosphonium salt into biochar. The thermogravimetric analysis test (curve 2 in FIG. 5) showed that there was 3.51% quaternary phosphonium salt loaded on the biochar.

Example 3

Synthesis of Magnetic Biochar-Quaternary Phosphonium Salt with Mass Ratio of 1:10 (MBQ-2)

1.0 g of magnetic biochar prepared in example 1 was taken into a beaker containing 200 mL deionized water. In the meanwhile, 10.0 g of dodecyl tributyl phosphonium bromide ($C_{24}H_{52}BrP$) was added into the above solutions under continuous stir overnight (12 h) at room temperature. After the full impregnation, dodecyl tributyl phosphonium bromide was self-assembled with magnetic biochar after agitating for 4 h at 65° C. After cooling to room temperature, the product was magnetically separated, washed several times until the pH of the washing liquid was neutral, and then placed in a vacuum drying oven (70° C., -0.06 MPa). Finally, the magnetic biochar-quaternary phosphonium salt with the mass ratio of 1:10 (MBQ-2) was obtained.

The saturation magnetization of MBQ-2 at room temperature was 53.29 emu/g (curve 3 in FIG. 2); as shown in FIG. 3 (XRD spectrum), the diffraction peaks of magnetite at 2θ=30.1°, 35.4°, 43.1°, 53.4° and 56.9° were also obtained (curve 3); in addition to the corresponding Fe—O characteristic peaks at 630 and 586 cm$^{-1}$ in FTIR spectrum (curve 3 in FIG. 4), the produced —$CH_2$ stretching vibration peaks were strengthened at 2924 and 2856 cm$^{-1}$. The thermogravimetric analysis test (curve 3 in FIG. 5) showed that there was 6.43% quaternary phosphonium salt loaded on the biochar.

Example 4

Synthesis of Magnetic Biochar-Quaternary Phosphonium Salt with Mass Ratio of 1:30 (MBQ-3)

1.0 g of magnetic biochar prepared in Example 1 was taken into a beaker containing 200 mL deionized water. In the meanwhile, 30.0 g of dodecyl tributyl phosphonium bromide ($C_{24}H_{52}BrP$) was added into the above solutions under continuous stir overnight (12 h) at room temperature. After the full impregnation, dodecyl tributyl phosphonium bromide was self-assembled with magnetic biochar after agitating for 4 h at 60° C. After cooling to room temperature, the product was magnetically separated, washed several times until the pH of the washing liquid was neutral, and then placed in a vacuum drying oven (70° C., −0.06 MPa). Finally, the magnetic biochar-quaternary phosphonium salt with the mass ratio of 1:30 (MBQ-3) was obtained.

The saturation magnetization of MBQ-3 at room temperature was 52.74 emu/g (curve 4 in FIG. 2); similar characteristic peaks were also verified in the XRD spectrum (curve 4 in FIG. 3) and FTIR spectrum (curve 4 in FIG. 4), respectively. The results of thermogravimetric analysis (curve 4 in FIG. 5) further proved that the loading amount of quaternary phosphonium salt in MBQ-3 increased to 10.25%.

Example 5

Synthesis of Magnetic Biochar-Quaternary Phosphonium Salt with Mass Ratio of 1:50 (MBQ-4)

1.0 g of magnetic biochar prepared in Example 1 was taken into a beaker containing 200 mL deionized water. In the meanwhile, 50.0 g of dodecyl tributyl phosphonium bromide ($C_{24}H_{52}BrP$) was added into the above solutions under continuous stir overnight (12 h) at room temperature. After the full impregnation, dodecyl tributyl phosphonium bromide was self-assembled with magnetic biochar after agitating for 4 h at 70° C. After cooling to room temperature, the product was magnetically separated, washed several times until the pH of the washing liquid was neutral, and then placed in a vacuum drying oven (70° C., −0.06 MPa). Finally, the magnetic biochar-quaternary phosphonium salt with the mass ratio of 1:50 (MBQ-4) was obtained.

The saturation magnetization of MBQ-4 at room temperature was 49.66 emu/g (curve 5 in FIG. 2); as shown in FIG. 3 (XRD spectrum), the diffraction peaks of magnetite at 2θ=30.1°, 35.4°, 43.1°, 53.4° and 56.9° were also obtained (curve 5). With the increase of mass ratio of quaternary phosphonium salt, the stretching vibration peak of —$CH_2$ was significantly strengthened (curve 5 in FIG. 4), which indirectly indicated the increase of the loading amount of quaternary phosphonium salt.

The results of thermogravimetric analysis (curve 5 in FIG. 5) also showed that 18.88% of the quaternary phosphonium salt was loaded on the magnetic biochar.

Example 6

Determination of Slow-Release Behavior of Magnetic Biochar-Quaternary Phosphonium Salt The synthesized composites of MBQ-1, MBQ-2, MBQ-3 and MBQ-4 (Example 2-5) were weighed 10 mg, respectively, added into centrifuge tubes containing 10 mL deionized water, and rotated on a rotating incubator at 25° C. Samples were taken at different times (6~72 h), followed by filtering through 0.22-μm mixed cellulose membrane. Quaternary phosphonium salt concentration in the filtrate was quantified using an inductive coupled plasma (ICP) emission spectrometer (Agilent Technologies, USA).

Figure 6:
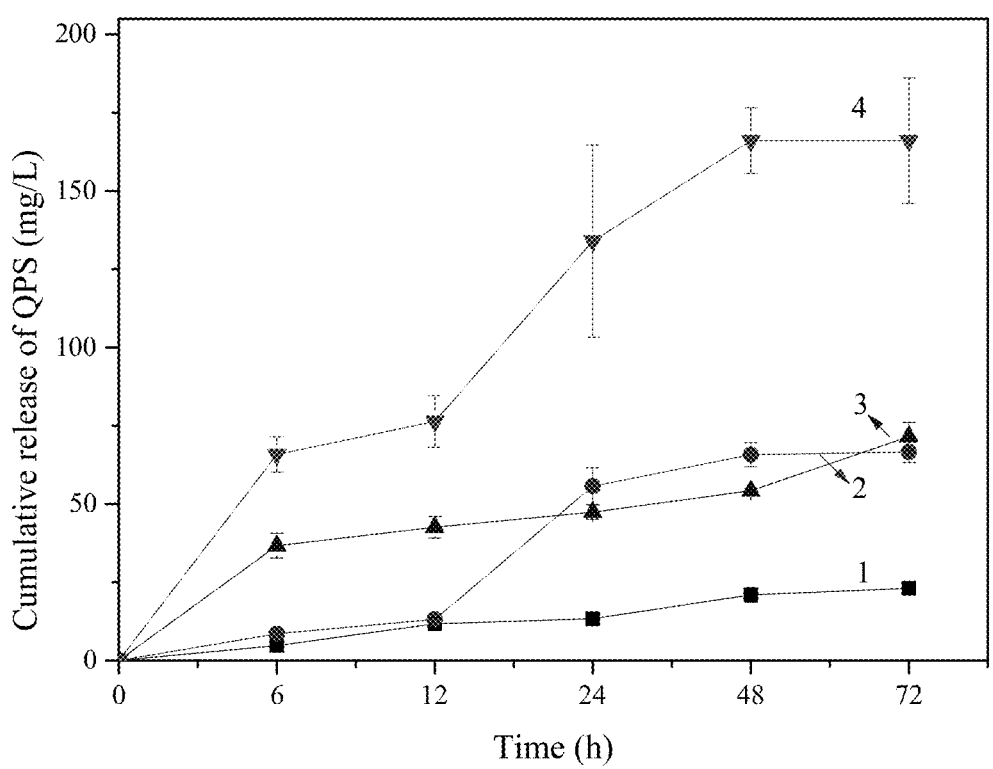
FIG. 6 shows the quaternary phosphonium salt (QPS) cumulative release profiles from magnetic bactericidal materials prepared in Example 2-5.

The results showed that the release amount of quaternary phosphonium salt in curves 1~4 (FIG. 6) increased with the increase of mass ratio of magnetic biochar to quaternary phosphonium salt. After 72 h rotary culture, the total release amount of quaternary phosphonium salt was 23.01, 66.57, 71.52 and 166.05 mg/L, respectively. The experiment identified that the material of this invention owned a good slow-release effect and a long-acting duration.

Example 7

Antibacterial Activity of Magnetic Biochar-Quaternary Phosphonium Salt

The representative strains used in the antibacterial activity test were ATCC 25922 *Escherichia coli* and ATCC 6538 *Staphylococcus aureus*, representing Gram-positive bacteria and Gram-negative bacteria, respectively. The bactericidal effect of magnetic biochar-quaternary phosphonium salt is tested according to AATCC-100 "shaking flask test method" and the determination method of bacteria and algae in industrial circulating cooling water (GB/T14643.2-2009). The bactericidal rate could reach to 50.46%~100% with the oscillation frequency of 180 rpm.

*Escherichia coli/Staphylococcus aureus* with 4% inoculation amount were transferred to Luria-Bertani (LB) medium (10.0 g/L tryptone, 5.0 g/L yeast extract, 10.0 g/L sodium chloride, pH 7.4) for overnight cultivation (about 12 h); in the next day, the strain was streaked on LB agar medium and cultured in a constant temperature incubator at 37° C. for 24 h.

The purified single strain was selected and inoculated in LB medium by shaking at 37° C. to logarithmic-phase. After low speed centrifugation (5000 rpm/min, 10 min), the bacterial suspension was washed with sterile saline for three times, and adjusted the bacterial density to $10^6$ CFU/mL. Bactericidal materials with various dosages and loading ratios were added into above bacterial suspensions, and incubated in a thermostatic incubator (37° C.) at 180 rpm for 24 h. Then, aliquots (100 μL) of the diluted bacterial suspension were spread on LB agar plates and incubated at 37° C. for 24 h to count the numbers of colonies.

The antibacterial ratio (R) was calculated according to the following equation (1):

$$R\ (\%) = (A_0 - A_1)/A_0 \times 100 \quad (1),$$

wherein $A_0$ and $A_1$ were defined as the number of colonies incubated with the untreated and treated samples, respectively.

The bactericidal effect of bactericidal materials with various dosage and loading ratios are shown in Table 1.

TABLE 1

The bactericidal effect of bactericidal materials with various dosage and loading ratios

| Bacteria | Material | 20 mg/L (%) | 50 mg/L (%) | 100 mg/L (%) | 200 mg/L (%) |
|---|---|---|---|---|---|
| Escherichia coli | MBQ-1 (1:1) | 50.46 ± 9.38 | 54.17 ± 10.56 | 56.02 ± 4.31 | 61.00 ± 4.07 |
| | MBQ-2 (1:10) | 98.31 ± 0.31 | 99.78 ± 0.01 | 99.98 ± 0.01 | 100.00 ± 0.00 |
| | MBQ-3 (1:30) | 99.12 ± 0.26 | 99.95 ± 0.01 | 100.00 ± 0.00 | 100.00 ± 0.00 |
| | MBQ-4 (1:50) | 99.93 ± 0.02 | 100.00 ± 0.00 | 100.00 ± 0.00 | 100.00 ± 0.00 |
| Staphylococcus aureus | MBQ-1 (1:1) | 55.89 ± 4.36 | 91.62 ± 0.28 | 98.69 ± 0.30 | 99.95 ± 0.02 |
| | MBQ-2 (1:10) | 100.00 ± 0.00 | 100.00 ± 0.00 | 100.00 ± 0.00 | 100.00 ± 0.00 |
| | MBQ-3 (1:30) | 100.00 ± 0.00 | 100.00 ± 0.00 | 100.00 ± 0.00 | 100.00 ± 0.00 |
| | MBQ-4 (1:50) | 100.00 ± 0.00 | 100.00 ± 0.00 | 100.00 ± 0.00 | 100.00 ± 0.00 |

Figure 7:
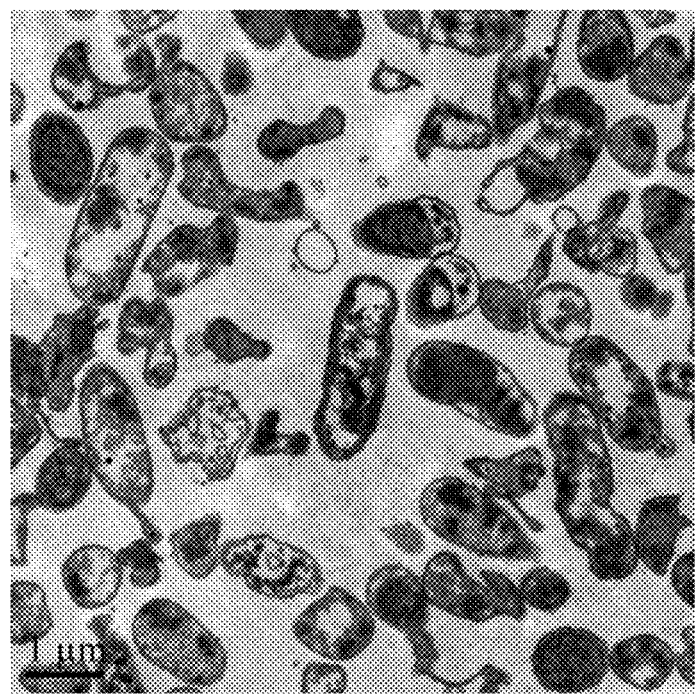
FIG. 7 is a transmission electron microscopy (TEM) image of *Escherichia coli* treated with magnetic bactericidal materials prepared in Example 2-5 in a scale of 1 μm.
Figure 8:
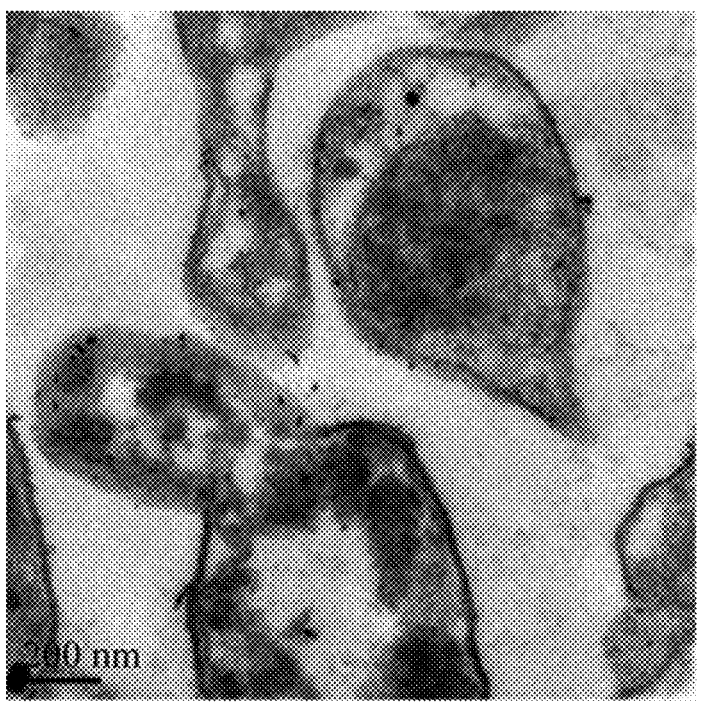
FIG. 8 is a transmission electron microscopy (TEM) image of *Escherichia coli* treated with magnetic bactericidal materials prepared in Example 2-5 in a scale of 200 nm.

The results in Table 1 showed that the magnetic biochar-quaternary phosphonium salt of this invention had a good bactericidal efficacy. As shown in FIG. 7 and FIG. 8, magnetic biochar-quaternary phosphonium salt can effectively damage the membrane structure of pathogenic bacteria, and make the intracellular substances that maintain physiological activities flow out, resulting in the abnormal subcellular structure and microbial death.

According to the above determination method, the bactericidal effect of the magnetic biochar in Example 1 was determined, and the results were shown in Table 2.

TABLE 2

The bactericidal effect of magnetic biochar with various dosage

| Bacteria | 20 mg/L (%) | 50 mg/L (%) | 100 mg/L (%) | 200 mg/L (%) |
|---|---|---|---|---|
| Escherichia coli | 27.66 ± 4.07 | 50.00 ± 3.91 | 45.14 ± 3.66 | 50.35 ± 5.93 |
| Staphylococcus aureus | 18.23 ± 5.96 | 24.87 ± 15.73 | 49.65 ± 5.03 | 89.12 ± 3.14 |

The results in Table 2 showed that the combination of magnetic particles and biochar had a certain bactericidal effect, which significantly enhanced the bactericidal effect of magnetic biochar-quaternary phosphonium salt.

Example 8

Regeneration of Magnetic Biochar-Quaternary Phosphonium Salt and Bactericidal Effect Test The bactericidal materials prepared in Examples 2-5 were used for antibacterial activities. After the bactericidal processes, the bactericidal materials were fixed by an external magnet and separated from the solution. Then the bactericidal materials were washed with deionized water for 2~3 times, and the recovered materials were dried in a vacuum drying oven.

The regenerative magnetic biochar-quaternary phosphonium salt bactericidal materials were obtained according to the preparation method of Examples 2-5. The bactericidal effect of the regenerative magnetic biochar-quaternary phosphonium salt was evaluated, and the determination process was basically the same as Example 7.

The comparison results of bactericidal effect between the regenerative material and first prepared material were shown in Table 3.

TABLE 3

The comparison results of bactericidal effect between the regenerative material and first prepared material

| Bacteria | Preparation sequence | Material | 20 mg/L (%) | 50 mg/L (%) | 100 mg/L (%) | 200 mg/L (%) |
|---|---|---|---|---|---|---|
| *Escherichia coli* | First prepared | MBQ-1 (1:1) | 50.46 ± 9.38 | 54.17 ± 10.56 | 56.02 ± 4.31 | 61.00 ± 4.07 |
| | | MBQ-2 (1:10) | 98.31 ± 0.31 | 99.78 ± 0.01 | 99.98 ± 0.01 | 100.00 ± 0.00 |
| | | MBQ-3 (1:30) | 99.12 ± 0.26 | 99.95 ± 0.01 | 100.00 ± 0.00 | 100.00 ± 0.00 |
| | | MBQ-4 (1:50) | 99.93 ± 0.02 | 100.00 ± 0.00 | 100.00 ± 0.00 | 100.00 ± 0.00 |
| | Regenerative | MBQ-1 (1:1) | 44.33 ± 3.66 | 78.82 ± 2.36 | 95.95 ± 2.71 | 98.03 ± 1.56 |
| | | MBQ-2 (1:10) | 99.21 ± 3.55 | 99.81 ± 2.43 | 100.00 ± 0.00 | 100.00 ± 0.00 |
| | | MBQ-3 (1:30) | 100.00 ± 0.00 | 100.00 ± 0.00 | 100.00 ± 0.00 | 100.00 ± 0.00 |
| | | MBQ-4 (1:50) | 100.00 ± 0.00 | 100.00 ± 0.00 | 100.00 ± 0.00 | 100.00 ± 0.00 |

The comparison results showed that the bactericidal effect of the regenerative material was significantly better than that of the first prepared material. That might be due to the residual covalent bonding quaternary phosphonium salt attached into the recovered materials, and the regeneration process improved the loading amount of quaternary phosphonium salt on the magnetic biochar. This regeneration method can not only effectively recover the bactericidal material, but also significantly enhance the bactericidal effect of the regenerated complex material.

Comparative Example

Comparison of Bactericidal Effect Between Magnetic Biochar-Quaternary Phosphonium Salt and Other Bactericidal Materials The comparison results of bactericidal effect between magnetic biochar-quaternary phosphonium salt and other bactericidal materials were shown in Table 4.

TABLE 4

The comparison results of bactericidal effect between magnetic biochar-quaternary phosphonium salt and other bactericidal materials

| Material | Concentration (mg/L) | Bactericidal effect of *Escherichia coli* (%) | Bactericidal effect of *Staphylococcus aureus* (%) |
|---|---|---|---|
| Ag—CoFe$_2$O$_4$-GO | 50 | 99.80 | 99.40 |
| Ps/Ag | 500 | 95.00 | 90.00 |
| HNTs-CS@Ag | 180 | 94.00 | 92.60 |
| GO-1227 | 10 | 99.98 | 99.97 |
| PTQ | 1000 | 94.40 | 99.50 |
| MBQs | 20 | 99.93 | 100 |

In the prior art, graphene oxide is used as the carrier of bactericidal material, which has a high bactericidal effect. For example, inorganic Ag—CoFe$_2$O$_4$-GO and organic GO-1227, fabricated by the carrier of graphene oxide, showed high antibacterial capacities, which only need the dosages of 50 and 10 mg/L, respectively, to remove the bacteria (up to $10^6$ CFU/mL) in water. Although graphene oxide carrier has excellent germicidal efficacy, it is difficult to be widely used in practical production due to its high cost. The simple synthesis of polystyrene silver nanoparticles (PS/Ag), abundant resources of chlorinated natural rubber quaternary ammonium salt (PTQ), and low-cost fabrication of chitosan silver nanocomposites (HNTs-CS@Ag) have been designed as new antibacterial agents, however, the actual dosages in disinfection are relatively large, up to 500, 1000 and 180 mg/L, respectively.

In view of the technical defects of the bactericidal material at the present stage, the magnetic biochar-quaternary phosphonium salt was prepared using the common biomass as raw materials, combining with a simple and mild preparation method. The results showed that only 20 mg/L was enough to remove pathogens in water environment, and the magnetic property for easy separation facilitated the water purification and reuse of antibacterial materials. This patent is expected to provide a new perspective for solving the pathogen pollution in water environment and improving the level of environmental health and safety.

What is claimed is:

1. A magnetic biochar-quaternary phosphonium salt bactericidal material, characterized by the preparation method of the material, comprising the following steps:

1 1-1) using corn straw biochar as a precursor to prepare magnetic biochar by a co-precipitation method;

1-2) adding the magnetic biochar into deionized water, followed by an addition of quaternary phosphonium salt, performing magnetic stirring at room temperature for saturated impregnation, then heating for a hydrothermal reaction, and cooling to room temperature to obtain the bactericidal material.

2. The magnetic biochar-quaternary phosphonium salt bactericidal material according to claim 1, wherein the heating temperature for a hydrothermal reaction is 60° C. to 70° C.

3. The magnetic biochar-quaternary phosphonium salt bactericidal material according to claim 1, wherein the mass ratio of the magnetic biochar to the quaternary phosphonium salt is 1:1 to 1:50.

4. The magnetic biochar-quaternary phosphonium salt bactericidal material according to claim 3, wherein the impregnation time in step 1-2) is not less than 12 h.

5. The magnetic biochar-quaternary phosphonium salt bactericidal material according to claim 4, wherein the quaternary phosphonium salt includes dodecyl tributyl phosphonium bromide.

6. The magnetic biochar-quaternary phosphonium salt bactericidal material according to claim 4, wherein step 1-1) further comprises the following steps:
 1) under an anoxic environment, adding $Fe^{3+}$ and $Fe^{2+}$ sequentially into deionized water with vigorous stirring, followed by an addition of ammonia, and adding a biochar suspension after the reaction is stable, followed by magnetically stirring in a water bath to obtain a product;
 2) performing solid-liquid separation of the product obtained in step 1), washing to remove impurities, and drying until the washing liquid is neutral in order to obtain the magnetic biochar.

7. The magnetic biochar-quaternary phosphonium salt bactericidal material according to claim 1, wherein the bactericidal material is used for the control of microbial contamination in water, and then the bactericidal material is separated and recovered from the water using a magnet.

8. A method of using the magnetic biochar-quaternary phosphonium salt bactericidal material according to claim 7 for the control of microbial contamination in water, further comprising the following steps:
 a) washing and drying the recovered bactericidal material, and then regenerating the bactericidal material according to step 1-2);
 b) adding the bactericidal material prepared in step a) into water containing microorganisms for sterilization; and
 c) repeating the steps a) and b).

9. A method of using the magnetic biochar-quaternary phosphonium salt bactericidal material according to claim 8, wherein the microorganisms include *Escherichia coli* and/or *Staphylococcus aureus*.

* * * * *